(12) United States Patent
Zaitsu et al.

(10) Patent No.: US 8,728,268 B2
(45) Date of Patent: May 20, 2014

(54) METHOD FOR MANUFACTURING RESIN MOLDING AND LASER BEAM IRRADIATION APPARATUS

(75) Inventors: Yoshihiro Zaitsu, Tokyo (JP); Kazuaki Hokoda, Tokyo (JP); Tatsuya Umeyama, Tokyo (JP); Shintaro Hirabayashi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 117 days.

(21) Appl. No.: 13/153,375

(22) Filed: Jun. 3, 2011

(65) Prior Publication Data

US 2011/0298160 A1 Dec. 8, 2011

(30) Foreign Application Priority Data

Jun. 3, 2010 (JP) ................................. 2010-127640
Aug. 10, 2010 (JP) ................................. 2010-179349

(51) Int. Cl.
*B29C 35/08* (2006.01)

(52) U.S. Cl.
USPC ...................................................... 156/272.8

(58) Field of Classification Search
USPC ........................................... 156/272.2, 272.8
See application file for complete search history.

(56) References Cited

U.S. PATENT DOCUMENTS

| | | | |
|---|---|---|---|
| 6,444,946 B1 * | 9/2002 | Korte | 219/121.6 |
| 6,464,374 B2 | 10/2002 | Akiyama et al. | |
| 6,478,451 B2 | 11/2002 | Akiyama et al. | |
| 6,592,239 B1 * | 7/2003 | Akiyama et al. | 362/267 |
| 2005/0100703 A1 * | 5/2005 | Terada et al. | 428/57 |
| 2006/0203859 A1 * | 9/2006 | Cable et al. | 372/20 |
| 2006/0237401 A1 * | 10/2006 | Amesbury et al. | 219/121.63 |

FOREIGN PATENT DOCUMENTS

| | | |
|---|---|---|
| JP | 10-310676 A | 11/1998 |
| JP | 2000-294013 A | 10/2000 |
| JP | 2001-243811 A | 9/2001 |
| JP | 2001-243812 A | 9/2001 |
| JP | 2004-349123 A | 12/2004 |

OTHER PUBLICATIONS

U.S. Appl. No. 13/021,681, filed Feb. 4, 2011, Yoshihiro Zaitsu et al.

* cited by examiner

*Primary Examiner* — Daniel McNally
(74) *Attorney, Agent, or Firm* — Kenealy Vaidya LLP

(57) ABSTRACT

A method for manufacturing a resin molding can be provided that uses a laser beam. The method can include providing the resin molding including welded portions that can impart high level of adhesion, have excellent appearance and provide very strong bonding strength. The method can also include arranging and pressing a weld region of a light-absorbing resin member and corresponding weld region of a light-transmitting resin member that are opposed to each other, and setting a plurality of irradiation areas in the extending direction of the welded regions. The method can also include arranging a plurality of laser irradiation scanning heads corresponding to the irradiation areas. Here, the irradiation areas can include a single irradiation area which the corresponding scanning head can irradiate with the laser beam and a composite irradiation area which the adjacent scanning heads can irradiate with respective laser beams. The method can further include causing the plurality of laser beams emitted from the scanning heads to repeatedly scan the single irradiation area along a first trajectory in the extending direction of the single irradiation area and part of both the single irradiation area and the composite irradiation area along a second trajectory in the extending direction, so that the entire welded regions are heated and fused to weld the light-transmitting resin member and the light-absorbing resin member.

13 Claims, 6 Drawing Sheets

METHOD FOR MANUFACTURING RESIN MOLDING AND LASER BEAM IRRADIATION APPARATUS

This application claims the priority benefit under 35 U.S.C. §119 of Japanese Patent Application Nos. 2010-127640 filed on Jun. 3, 2010, and 2010-179349 filed on Aug. 10, 2010, which are each hereby incorporated in their entirety by reference.

TECHNICAL FIELD

The presently disclosed subject matter relates to a method for manufacturing a resin molding and a laser beam irradiation apparatus.

BACKGROUND ART

Conventional vehicle lights can employ a resin molding for reasons and benefits in view of heat resistance, weather resistance, optical characteristics and the like. Such a resin molding may include a housing formed from a light-absorbing resin using acrylonitrile styrene acrylate (ASA) and the like and can also be imparted with a light absorbing property. A lens can be included that is formed from a light-transmitting resin such as a polymethylmethacrylate (PMMA) or a polycarbonate and is welded to the housing.

Japanese Patent Application Laid-Open No. 2000-294013 (corresponding to Japanese Patent No. 3973792, and U.S. Pat. No. 6,592,239B1) discloses a vehicle light in which a lens and a lamp body (housing) are welded. In this vehicle light, the lens is pressed against the lamp body, and in this state, a laser beam is allowed to be incident on and pass through the transparent lens. The passing beam can be incident on the lamp body surface that is in contact with the lens while being pressed to heat and fuse the lamp body surface. The fusing heat in the lamp body surface can be transferred to the ends of the seal support legs of the lens. The technique disclosed in this publication proposes the scanning with a laser beam along the entire circumference of the lens to integrate the lens and the lamp body together. In this technique, the lamp body is provided with a positioning groove for preventing the seal support legs of the lens from becoming displaced. Accordingly, the lens and the lamp body can be laser-welded while the physical relationship therebetween can be maintained by the groove and legs. Furthermore, even if a slight bun is generated, it can be confined within the positioning groove.

The technique disclosed in Japanese Patent Application Laid-Open No. 2001-243811 (corresponding to U.S. Pat. No. 6,464,374B2) is similar to the technique disclosed in Japanese Patent Application Laid-Open No. 2000-294013. The basic welding method disclosed in the previous publication is improved by the proposed method in which the bonded surface is inclined so that the laser beam can be obliquely incident on that surface. During the irradiation, a transparent plate is placed on the surface of a lens employed in the disclosed system, thereby reducing the light refraction effect to eliminate the condensing of light. Therefore, the light can reach the entire surface of the welded bonding surface to improve the bonding strength.

However, a method of welding a resin molding using a laser beam has not been fully developed as of yet in terms of sufficient bonding strength, simplicity of the process, and the like.

Further developments relating to a welding method have been performed in order to solve or at least address the above characteristics, features, and problems for a vehicle light having a lens and a housing that are welded together. Japanese Patent Application Laid-Open No. Hei 10-310676 discloses a resin composition for molding housings. This technique can utilize a resin composition for molding a housing to suppress the stringing phenomenon of the molten resin during welding of the housing that is thus molded.

Japanese Patent Application Laid-Open No. 2004-349123 discloses a welding method of heating and welding a housing and a lens without optical loss of the welding laser beam. Therein, an elastic light guiding member capable of conforming to the lens shape and a flat transparent base material can be disposed on the lens surface. In this state, a compression load is applied to bring the elastic light guiding member and the lens into close contact with each other. In this technique, the used members are selected to have the same or substantially same refractive index as those of the other members, so that the optical loss due to refraction or the like may be suppressed. In this way, the laser beam heating and welding can be facilitated.

Further, a typical vehicle light may have a housing with an inner surface subjected to aluminum deposition so that the inner surface of the housing can serve as a light reflecting surface. When such a light reflecting film, like an Al film, is deposited on a portion of the molded housing that is to be welded (sealed), the welding laser beam may be reflected thereon in a normal laser welding condition, resulting in welding failure. To cope with this characteristics/problem, a mask can be applied onto the welding portion of the housing before the Al deposition process so that the light reflecting film is prevented from being formed on the welding portion during the laser welding.

When a mask is provided onto the welding surface of the welding portion of the housing during the formation of a light reflecting film on the inner surface of the housing, the dedicated step for providing a mask onto a required area (masking process) is typically added, thereby increasing the manufacturing cost. In this case, when the mask is inaccurately provided or a masking treatment fails, aluminum may scatter and adhere to the welding surface of the housing.

SUMMARY

The presently disclosed subject matter was devised in view of these and other problems and features and in association with the conventional art. According to an aspect of the presently disclosed subject matter, a method for manufacturing a resin molding can be provided that uses a laser beam. The method can provide a resin molding including welded portions that can impart a high level of adhesion, have excellent appearance, and can provide very strong bonding strength.

According to another aspect of the presently disclosed subject matter, a method for manufacturing a resin molding can be provided that can perform welding by a laser beam even if the welding surface includes a light reflecting film.

According to still another aspect of the presently disclosed subject matter, a method for manufacturing a resin molding can be provided, with the resin molding including a light-absorbing resin member having a welded region extending in a predetermined extending direction and a light-transmitting resin member having a corresponding welded region extending in a predetermined extending direction. The method can include: arranging and pressing the welded region of the light-absorbing resin member and the corresponding welded region of the light-transmitting resin member so that they are opposed to each other and are brought into contact with each other; setting a plurality of irradiation areas in the extending direction of the welded regions and arranging a plurality of laser irradiation scanning heads corresponding to the respective irradiation areas so that the scanning heads can emit laser beams to be incident on the light-transmitting resin member, with the irradiation areas including a single irradiation area which the corresponding scanning head can irradiate with the laser beam and a composite irradiation area which the adjacent scanning heads can irradiate with the respective laser beams; activating the plurality of scanning heads to cause the plurality of laser beams to repeatedly scan the single irradiation area along a first trajectory in the extending direction of the single irradiation area and part of both the single irradiation area and the composite irradiation area along a second trajectory in the extending direction, so that the entire welded regions are heated and fused to weld the light-transmitting resin member and the light-absorbing resin member.

In this case, the laser beams can be scanned along the first trajectory and the second trajectory alternately.

Further, a plurality of scanning lines can be set in a width direction of the welded region perpendicular to the predetermined extending direction so that the scanning lines extend in the extending direction, and the laser beams can be scanned sequentially along the plurality of scanning lines.

Furthermore, the laser beams can be scanned at a predetermined scanning speed depending on an angle of incidence with respect to the welded region.

Furthermore, the laser beams can be scanned with a predetermined focal distance depending on an angle of incidence with respect to the welded region.

Further, the composite irradiation area can have a width of 20 mm (or ±20 mm with respect to a basis position described later).

According to still another aspect of the presently disclosed subject matter, a laser beam irradiation apparatus can weld a resin molding, with the resin molding including a light-absorbing resin member having a welded region extending in a predetermined extending direction and a light-transmitting resin member having a corresponding welded region extending in a predetermined extending direction. The apparatus can include a plurality of scanning heads each including a laser oscillator for emitting a laser beam with predetermined properties and a laser optical system for guiding the laser beam emitted from the laser oscillator. In this configuration, the welded region of the light-absorbing resin member and the corresponding welded region of the light-transmitting resin member can be arranged and pressed so that they are opposed to each other and are brought into contact with each other. In this state, while the plurality of scanning heads can be disposed near the light-transmitting resin member, the plurality of scanning heads can emit a plurality of the laser beams to scan along a scanning line along the extending direction of the welded regions with the scanning line being divided into trajectories of the plurality of laser beams. The scanning can be achieved by connecting the trajectories of the laser beams (or the divided parts of the scanning line) and at that time positions where the trajectories of the plurality of laser beams are connected can be changed along the extending direction.

Herein, the laser optical system can include a Galvano scanner.

According to principles of the presently disclosed subject matter, the welded region can be uniformly irradiated with the laser beams for welding, thereby suppressing the unevenness of the welded resin amount over the welded region and facilitating the entirely uniform welding with a gap disappearing.

According to a still further aspect of the presently disclosed subject matter, a method for manufacturing a resin molding can be provided. The method can include: (a) preparing a light-absorbing resin member having a welded region and a light-transmitting resin member having a welded region corresponding to the welded region of the light-absorbing resin member; (b) forming a light reflecting film on the light-absorbing resin member at a predetermined area; (c) irradiating the welded region of the light-absorbing resin member with a laser beam having a beam spot diameter of 1.0 mm or less as a first focusing state to remove the light reflecting film in the welded region of the light-absorbing resin member; and (d) pressing the light-absorbing resin member and the light-transmitting resin member so that the welded regions of the light-absorbing resin member and the light-transmitting resin member are brought into contact with each other and repeatedly irradiating the welded region of the light-absorbing resin member with a laser beam having a beam spot diameter of 1.5 mm or more and 3.5 mm or less as a second focusing state to weld the light-absorbing resin member and the light-transmitting resin member.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a method for manufacturing a resin molding and a laser beam irradiation apparatus made in accordance with the principles of the presently disclosed subject matter with reference to the accompanying drawings in accordance with exemplary embodiments. First, a description will be given of an exemplary method for manufacturing a resin molding.

First, a light-transmitting (clear) resin member and a light-absorbing (light-absorbing, opaque, for example, resin containing a colorant) resin member can be arranged to be opposite to each other and pressed together making contact with each other, and a laser beam can be applied from the light-transmitting resin member side. Then, the laser beam can pass through the light-transmitting resin member to reach the light-absorbing resin member. When the laser beam is absorbed by the light-absorbing resin member, the light-absorbing resin member can be heated, softened and then fused. Because the light-transmitting resin member can be in contact with the light-absorbing resin member under pressure, the heat generated in the light-absorbing resin member can be conducted to the light-transmitting resin member especially at the contact region. Therefore, the light-transmitting resin member can also be softened, thereby increasing the contact region and eventually fusing the light-transmitting resin member as well. Both members can then be fused and welded (adhered) together at the contact region (welded region).

In general, for a resin molding such as those utilized in a vehicle light, a laser beam can be scanned while continuously welding resin members under pressure along the peripheries where the members are pressed to make contact with each other. The inventors investigated a welding method that repeatedly irradiates a molding with a laser beam during high-speed scanning along a welded region set to the periphery of the molding and which almost simultaneously heats and fuses the entire welded region so as to weld the resin members together. In particular, the inventors investigated the welding method utilizing a Galvano scanner as one exemplary means that allows a laser beam to be scanned at a high speed.

Figures 1A, 1B, 1C:
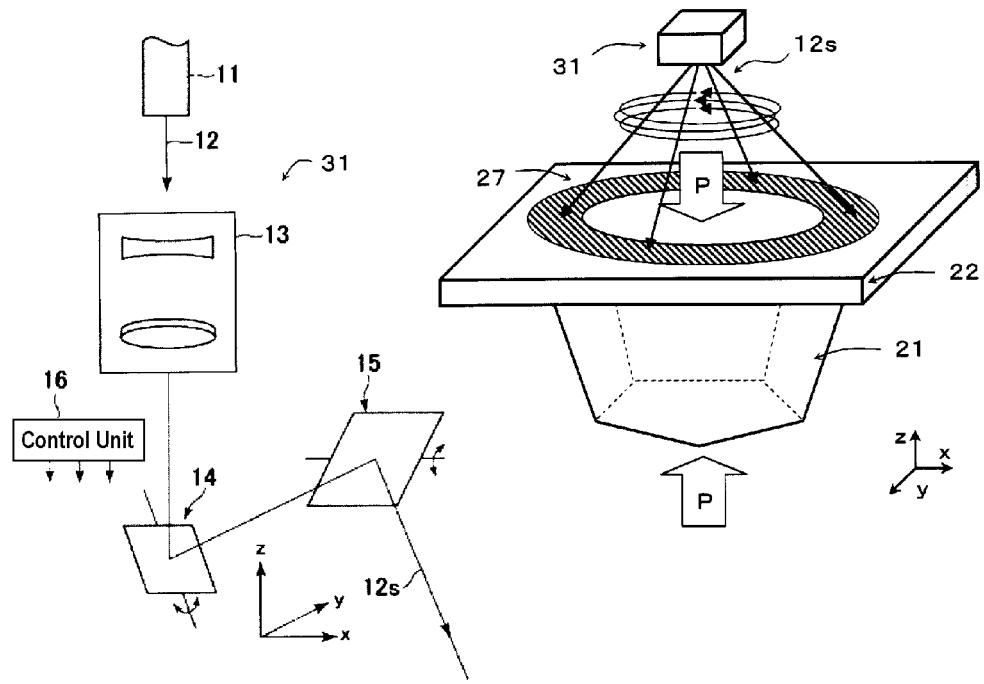
FIG. 1A is a schematic block diagram showing a scanning head having a laser optical system used in an exemplary manufacturing method in accordance with principles of the presently disclosed subject matter.
FIG. 1B is a schematic perspective view illustrating the welding by repetitive laser irradiation.
FIG. 1C is a graph showing the temperature change according to the laser irradiation time.

FIG. 1A is a diagram that schematically shows the configuration of a scanning head of a laser beam welding apparatus including a laser optical system using a Galvano scanner. The scanning head 31 can include a focal point adjustment optical system 13, an x Galvano mirror 14, a y Galvano mirror, a control unit 16, and other components. A laser oscillator can be connected to an optical fiber from which the tip end can project a laser beam 12 along an optical path. On the optical path, the focal point adjustment optical system 13 can be adjusted to be positioned in place. The focal point adjustment optical system 13 can include a movable lens (not shown) to adjust the focal position on the optical path. Then, the focal point adjustment optical system 13 can project a laser beam along an optical path. On the optical path, the x Galvano mirror or a first Galvano mirror 14 can be disposed to scan a processed surface with a laser beam in an x direction. On an optical path along which the laser beam reflected by the first Galvano mirror 14 can pass, the y Galvano mirror or a second Galvano minor 15 can be disposed to scan the processed surface with a laser beam in a y direction. Galvano minors are lightweight allowing high-speed scanning, and accordingly, suitable for the purpose of the presently disclosed subject matter.

The control unit 16 can control the Galvano mirrors 14 and 15 and the focal point adjustment optical system 13. An emitted laser beam 12s can be utilized for an xy scanning within a two-dimensional plane by means of the Galvano mirrors 14 and 15. In addition, the focal length can be controlled, so that the focal position can be moved in a z direction by means of adjusting the focal point adjustment optical system 13. In other words, the adjustment of the focal point of the laser beam can allow the laser beam to be scanned three-dimensionally. If the scanning is only achieved two-dimensionally, a scanning head with an fθ lens can be used instead of the focal point adjustment optical system 13.

FIG. 1B is a schematic perspective view showing a repeated laser irradiation on a workpiece that has a two-dimensional welded region arranged within the xy plane. A lens 22 formed from a light-transmitting resin can be arranged opposite to a container-shaped housing 21 formed from a light-absorbing resin so as to close the opening of the housing 21. The lower surface of the lens 22 and the upper surface of the housing 21 are brought into contact with each other under pressure by a pressure P in the z-direction. The laser beam 12s can pass through the lens 22 from above in the z-direction, thereby irradiating the upper surface of the housing 21. The irradiation position can be repeatedly scanned along the welded region 27 by means of driving the Galvano minors 14 and 15 of the laser optical system. As described with reference to the configuration of FIG. 1A, the first Galvano mirror 14 can scan in the x direction and the second Galvano minor 15 can scan in the y direction.

FIG. 1C is a graph schematically showing temperature changes with time at one laser irradiation position. The temperature rises for a single laser beam irradiation and starts to fall after the completion of the irradiation. Before the irradiated portion is cooled to the temperature before the irradiation, the next laser beam is irradiated and the temperature there rises again. The average temperature gradually rises by means of the repeated laser beam irradiation. If the irradiation position within the welded region changes, similar temperature changes will occur at slightly shifted timing. In this manner, the entire welded region can be heated almost uniformly and almost at the same time by sequentially moving the irradiated position.

Normally, there are fine irregularities, which occur during the molding, and which exist on the surfaces of the housing 21 and the lens 22. Because of this, localized gaps may exist between the resin members which are brought into contact with each other under a certain pressure. If the entire welded region is in a fused state, both of the resins will melt and blend together and the gaps will effectively disappear due to the pressure thereby making it possible to obtain a strong weld.

Since the laser light source is fixed during the welding process using a Galvano scanner, the laser beam can be incident by an angle (angle of incidence) with respect to the normal of the welded region. The angle of incidence may vary depending on the distance from the light source to the laser irradiation position, the shape of the molding, and the like. For example, if the welded region has a larger size, it would be significant that the angle of incidence can vary depending on the laser irradiation position. Also, the irradiation area may vary depending on the change in the angle of incidence. If the laser beam is scanned at a constant speed, the incident energy per unit time and/or per unit area may vary resulting in significantly uneven achieved temperature within the welded region. The variation in achieved temperature within the welded region may lead to the problems of resin foaming due to excess heating, welding failure due to insufficient heating, and the like. As a result, there may be an outer appearance of a molding deteriorating, an insufficient bonding strength, and the like.

To cope with these problems, the manufacturing method of the presently disclosed subject matter can utilize a plurality of scanning heads and divide the irradiation area to limit the irradiation area that is irradiated by one scanning head. In this way, it is believed that the variation in the angle of incidence within the welded region can be suppressed while the variation in achieved temperature can be relaxed or kept to a minimum. In view of this assumption, the present inventors conducted test welding using test pieces in a mode wherein a plurality of scanning heads can project laser beams at a same time.

Figure 2A:
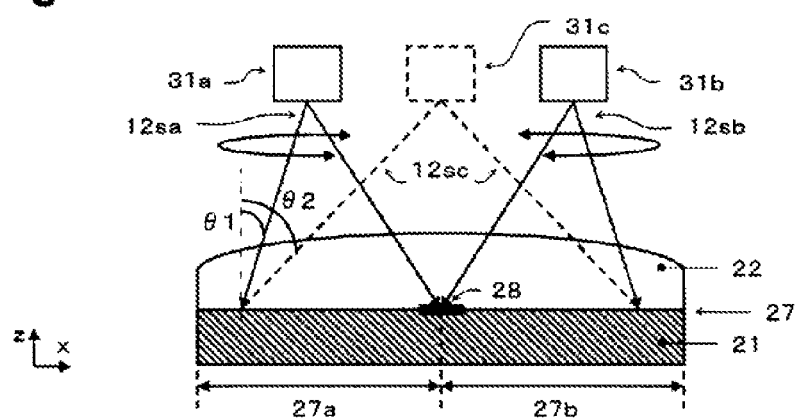
FIG. 2A is a schematic cross sectional view and FIGS. 2B and 2C are perspective views each showing a test welding utilizing a plurality of laser beams.

FIG. 2A is a schematic cross sectional view showing the test welding. The prepared test piece had a welded region 27 with a 2 mm width and 150 mm length in the shape of a linear band. In this test welding, the used test piece 21 for a housing was formed from ASA and the test piece 22 for a lens was formed from PMMA. Scanning heads 31a and 31b were arranged above the test pieces symmetrically with respect to the center of the test piece, for example. Herein, the irradiation areas 27a and 27b of the respective scanning heads were set to approximately 75 mm from the respective longitudinal ends. The laser beams projected from the scanning heads 31a and 31b were fiber laser at a wavelength of 1070 nm with an output power of 70 W. The beam diameter of the laser beams 12sa and 12sb projected from the scanning heads 31a and 31b were set to the same size as the width of the welded region. Welding was performed by irradiating the respective irradiation areas 28a and 28b with the laser beams at a scanning speed of 10 m/sec along the same scanning trajectory repeatedly 600 times (or 300 times of back and forth).

FIG. 2A also illustrates the case where a single scanning head 31c was arranged above the center of the test piece by a dotted line. In this case, at the edge of the welded region the angle of incidence θ2 by the single scanning head 31c became greater than the angle of incidence θ1 by the two scanning heads 31a and 31b for irradiating two divided irradiation areas. In particular, if the size of the welded region is large, the division of the irradiation areas for using the plurality of scanning heads can suppress the variation in the angle of incidence within the welded region, thereby making the achieved temperature more uniform.

If the plurality of scanning heads are used to repeatedly irradiate with laser beams along the same scanning trajectory, as shown in FIG. 2A, there may be generated an area 28 between the irradiation areas 27a and 27b by the respective laser beams (the area shall be referred to as "connection point"). At this connection point, if the overlapped area of the irradiated areas is wide, the area may be overheated due to double irradiation of laser beams. In this case, there may be resin foaming or an outer appearance deterioration. Conversely, if the single irradiated areas (not overlapped areas) are wide, the area may be insufficiently heated, resulting in welding failure. In this case, the bonding strength may be insufficient. The present test welding could reveal that the tolerance for the overlapped/non-overlapped area (composite irradiation area) of the single irradiation area was approximately ±0.25 mm. In this case, the bonding strength could be ensured while the outer appearance did not deteriorate. Please note that the positive sign of the composite irradiation area means the laser beams are scanned in an overlapped manner while the negative sign means the laser beams do not overlap with each other. If the tolerance for the composite irradiation area is narrow, high accuracy will be required during the processing and assembling of the manufacturing method. This may be a restriction, and accordingly, it is desired that the tolerance be as large as possible.

Next, the present inventors examined laser beams that can be repeatedly irradiated along a plurality of different scanning trajectories.

Figure 2B:
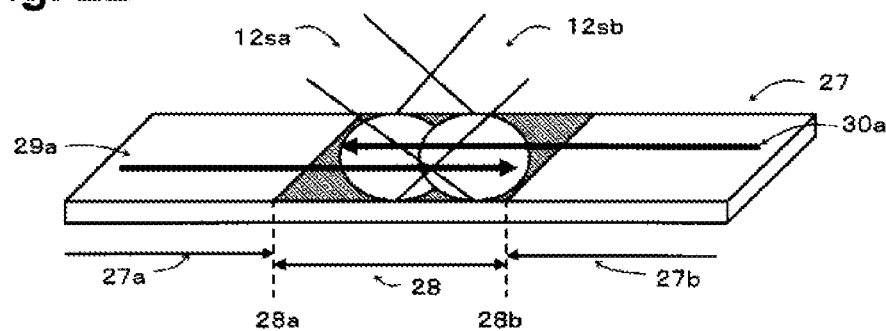
Figure 2C:
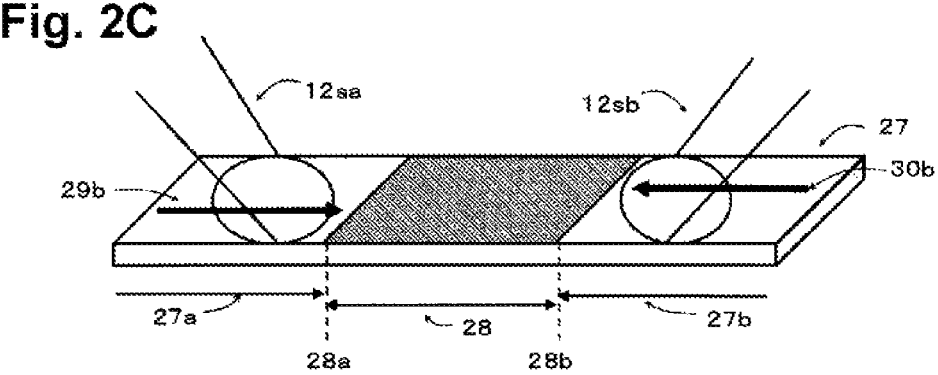

FIGS. 2B and 2C are perspective views showing the scanning trajectory example for a laser beam near the composite irradiation area. Specifically, FIG. 2B shows scanning trajectories 29a and 30a for laser beams 12sa and 12sb at X cycles (X is an odd number) while FIG. 2C shows scanning trajectories 29b and 30b at Y cycles (Y is an even number). In the drawings, the scanning trajectories of the respective laser beams are illustrated while shifted relative to others in order to facilitate the understanding. The areas where the laser irradiation is applied once by each of the scanning heads shall refer to the single irradiation areas 27a and 27b while the area where the adjacent scanning heads irradiate with laser beams shall refer to the composite irradiation area 28. Boundary positions 28a and 28b are shown between these areas. As shown in FIG. 2B, the laser beam 12sa can be scanned along the scanning trajectory 29a, pass the first boundary position 28a between the irradiation area 27a and the composite irradiation area 28, and reach the second boundary position 28b which is the other end portion of the composite irradiation area 28. The laser beam 12sb can be scanned along the scanning trajectory 30a, pass the second boundary position 28b, and reach the first boundary position 28a. In FIG. 2C, the laser beam 12sa can be scanned along the scanning trajectory 29b up to the first boundary position 28a without entering the composite irradiation area 28. Also, the laser beam 12sb can be scanned along the scanning trajectory 30b up to the second boundary position 28b.

This type of laser scanning method can perform the laser scanning, for example, twice including the scanning passing the end of the composite irradiation area at least once, so that no un-irradiated region remains at all times. Furthermore, the scanned (irradiated) area is different between the case where the scanning is performed at X cycles (odd number) and the case where the scanning is performed at Y cycles (even number), and accordingly, there is no area that is irradiated with laser beams twice at all times. The composite irradiation area is irradiated with laser beams the same times as the other irradiated area (single irradiation areas) in total. Therefore, all over the regions can be averaged in terms of achieved temperatures by the laser beam scanning at high speed. It is confirmed that the results derived from the present test welding have revealed that the tolerance for the composite irradiation area can be increased to ±0.25 mm, and it is believed that it can be extend further theoretically.

The scanning of each laser beam along the scanning trajectory can be performed not only in a mode in which the scanning trajectories 29a and 30a and the scanning trajectories 29b and 30b are combined, but also in another mode in which the scanning trajectories 29a and 30b and the scanning trajectories 29b and 30a are combined so that the respective laser beams are irradiated alternately within the composite irradiation area. In this way, the same or similar advantageous effects can be achieved. Suppose that the scanning trajectories 29a and 30a are utilized for laser irradiation several times, and then the scanning trajectories 29b and 30b are utilized for laser irradiation the same number of times. Even in this case, the achieved temperature may not significantly vary because the laser scanning utilizing a Galvano scanner can be performed at high speed.

As described, the test welding was discussed with reference to several examples in which a plurality of scanning heads project laser beams to scan along a plurality of different scanning trajectories, so that the achieved temperatures within the welded region are averaged. Hereinafter, a description will be given of the welding processing to an actual workpiece such as a vehicle light.

Figure 3A:
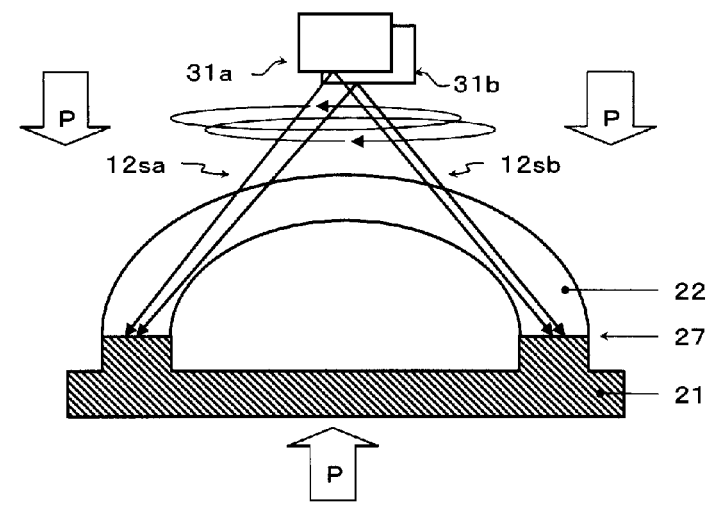
FIG. 3A is a schematic cross sectional view showing the state where a plurality of laser beams are repeatedly irradiated along a plurality of different scanning trajectories to weld the welded regions.

FIG. 3A is a cross sectional view schematically showing a workpiece having a welded region arranged within a two-dimensional plane. Specifically, a lens 22 formed from a light-transmitting resin can be arranged over a housing 21 formed from a light-absorbing resin so that an opening of the housing 21 is closed. In this case, a welding rib (welded region) may be formed on the top surface of the housing 21 as shown in FIG. 3A. Note that such a rib may not only be on the housing, but also on the ring. In this state, they are pressed in the z direction under a pressure P so that the upper surface of the housing 21 and the lower surface of the lens 22 can be brought into close contact with each other. The scanning heads 31a and 31b that are to be used can be configured to include, as shown in FIG. 1A, a focal point adjustment optical system 13, an x Galvano mirror 14, a y Galvano mirror, a control unit 16, and other components. The scanning heads 31a and 31b can project laser beams 12sa and 12sb having a beam diameter corresponding to the rib width. The laser beams 12sa and 12sb can pass the lens 22 and be incident on the top surface of the housing 21. Each laser beam can be scanned at predetermined irradiation positions along the rib by driving the Galvano mirrors 14 and 15 of the scanning heads 31a and 31b.

It should be noted that the plurality of scanning heads may receive laser beams from other laser light sources, or may receive laser beams obtained by dividing a laser beam from a single laser beam light source. Furthermore, the laser light source may be YAG laser, semiconductor laser, fiber laser, and the like.

Figure 3B:
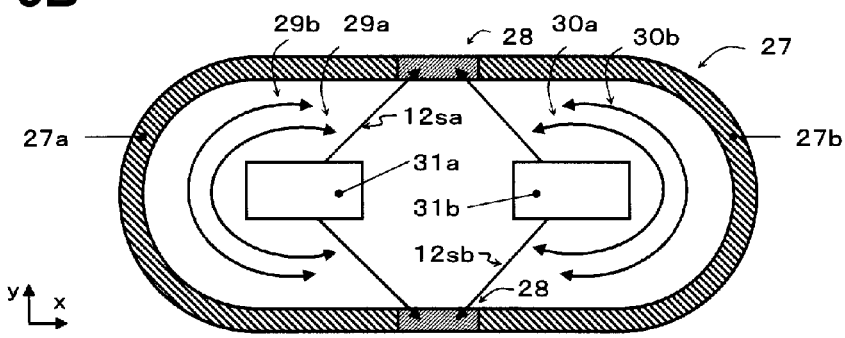
FIG. 3B is a plan view thereof.

FIG. 3B shows an example of the shape of the two-dimensional welded region 27. The welded region 27 is an oval band shape or loop shape, for example. The scanning heads 31a and 31b can be arranged above the inside region of the welded region 27, for example, above the respective focal positions of the oval. Accordingly, single irradiation areas 27a and 27b can be set corresponding to the respective scanning heads. The laser beams 12sa and 12sb emitted from the scanning heads 31a and 31b can be scanned along each of the trajectories 29a, 30a, 29b and 30b alternately and repeatedly. Herein, for example, the trajectory 29a can be a scanning trajectory that extends in the region of the composite irradiation area 28 and the single irradiation area 27a, and the trajectory 30a can be a scanning trajectory that extends in the region of the composite irradiation area 28 and the single irradiation area 27b. The trajectory 29b can be a scanning trajectory that extends only in the region of the single irradiation area 27a, and the trajectory 30b can be a scanning trajectory that extends only in the region of the single irradiation area 27b.

When the laser beam irradiation is repeatedly performed a plurality of times at the same location, the temperature of the welded target or the resin member reaches its melting temperature. Specifically, if the laser beam irradiation is performed certain times at the same location, then the temperature of the resin member at the same location reaches its softening temperature (or glass transition temperature). Furthermore, if the laser beam irradiation is additionally performed another certain times at that same location, then the temperature of the resin member reaches its melting temperature to melt the resin member. In this manner, the welded region including the single irradiation areas and the composite irradiation area can be uniformly heated and melted to achieve the welding there.

If the welded region is shaped in a complex shape, the angle of incidence may change slightly within the irradiation areas. In this case, the scanning speed can be controlled depending on the change of the angle of incidence, so that the achieved temperatures across the welded region can be averaged. For example, the scanning speed can be decreased at positions where the angle of incidence is relatively large and thus the incident energy density is low. The scanning speed can be increased at positions where the angle of incidence is relatively small and thus the incident energy density is high. In this manner, the temperatures within the welded region can be averaged. This type of control can be performed by means of the control unit 16 as shown in FIG. 1A. It should be noted that three or more scanning heads can be utilized to finely divide the irradiation areas so that the change of the angle of incidence can be suppressed further. Even with three or more scanning heads, the similar laser scanning method performed within respective composite irradiation areas can expand the tolerances at respective areas.

It should be noted that the technique in accordance with the presently disclosed subject matter can be achieved not only with the two-dimensional welded region but also three-dimensional welded region.

Figure 3C:
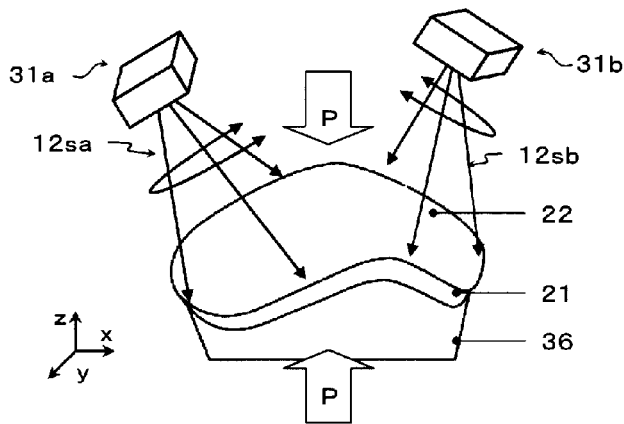
FIG. 3C is a perspective view of a resin molding with a three-dimensional shape.

FIG. 3C is a perspective view schematically showing the laser beam welding in a three-dimensional scanning mode in the case where the welded region of the lens and housing extends not two-dimensionally, but three-dimensionally. For example, a housing 21 formed from a light-absorbing resin can be disposed on a jig 36 supported on a horizontal surface. A lens 22 formed from a light-transmitting resin can be disposed over the housing 21 so that both the welded regions face to each other. As shown, the arranged welded regions of the housing 21 and the lens 22 have a three-dimensional structure. In this state, a pressure P is applied to the housing 21 and the lens 22 in a direction where they are brought into contact with each other. Scanning heads 31a and 31b disposed above the loop-shape welded regions can scan the welded regions with the laser beams 12sa and 12sb a plurality of times along a plurality of different scanning trajectories. During this laser scanning, the Galvano mirrors 14 and 15 can control the positions within the two-dimensional coordinate system while the focal point adjustment optical system 13 can control the focal lengths in the z direction, thereby maintaining a constant focusing state at the welded positions in a three-dimensional space. Specifically, in this case, the focused laser beams 12sa and 12sb may be slightly defocused so that the focal position is slightly in front of or in rear of the welded region 27, so called "rear-side focusing" or "front-side focusing". By doing so, the wider area can be melted by the defocused and thus widened laser beam, thereby obtaining stronger bonding. The focal point adjustment optical system 13 can control the z-directional focal length based on the control of the control unit 16 as shown in FIG. 1A. By controlling the z-directional focal length, as in the case of two-dimensional welded region, three-dimensional welded region can be subjected to laser welding without restriction with regard to the three-dimensional irradiation areas.

Figure 4A:
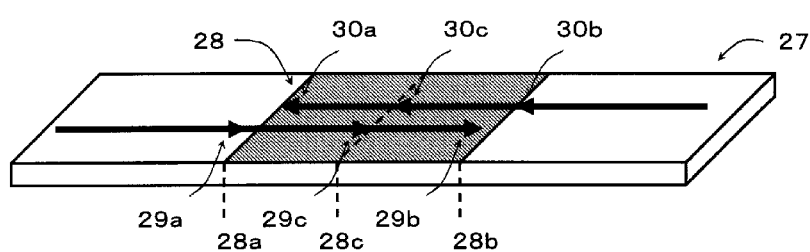
FIGS. 4A and 4B are each a perspective view partly showing a modified example of the exemplary welding method in which repeatedly irradiating occurs with a plurality of laser beams along a plurality of different scanning trajectories.
Figure 4B:
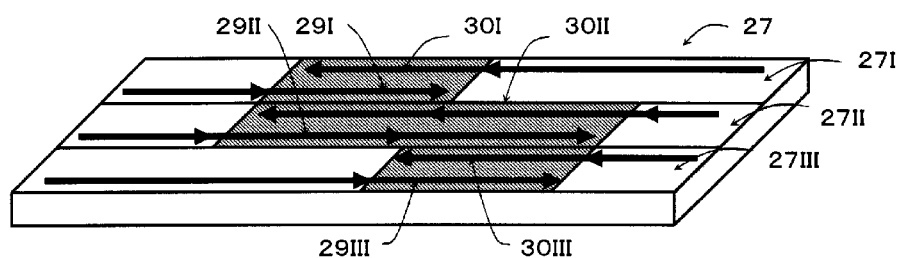

FIGS. 4A and 4B illustrate a modified example of the welding method by using a plurality of scanning heads and repeatedly irradiating with a plurality of laser beams along a plurality of different scanning trajectories. As shown in FIG. 4A, in addition to the scanning trajectories 29a and 30a in the region of the composite irradiation area and the single irradiation areas and the scanning trajectories 29b and 30b in the region of the single irradiation areas, additional scanning trajectories 29c and 30c including the center area of the composite irradiation area can be set. More scanning trajectories may be set. If a plurality of scanning trajectories are set, the connection positions between the respective laser beam irradiations may vary. As shown in FIG. 4B, if the welded region has a wider width, a plurality of scanning lines (trajectories) may be set onto the welded region in the width direction. Each scanning line can include a trajectory or trajectories. For example, the scanning line 27I includes scanning trajectories 29I and 30I so that the single irradiation areas and the composite scanning area are scanned with respective laser beams. In other scanning lines 27II and 27III, respective laser beams can be scanned along the scanning trajectories 29II and 29III, and 30II and 30III. The respective scanning trajectories can be repeatedly irradiated with laser beams at a high speed, thereby heating and melting the entire welded region at almost the same timing.

Please note that if the scanning head can repeatedly irradiate trajectories that are positioned with an interval, the scanning head may be controlled to intermittently project a laser beam along the trajectories. This can be done by activating/deactivating the laser light source, by setting a mechanical shutter in the optical path(s), or the like.

Furthermore, the back-and-forth movement may be replaced with a single directional movement (one-way movement) covering the welded region. In this case, the scanning head can be controlled to intermittently project a laser beam (turned on during the movement along the trajectories and turned off during the returning to the original point).

Next, a description will be given of the case where in the above welding process an aluminum film (Al film) is vapor deposited over the pre-welded surface of a light-absorbing (opaque) resin member as a light reflecting film. In this case, the laser beam incident on the welded surface with Al film may be reflected under a normal laser welding condition.

In view of this, the present inventors examined the Al film removing process performed in the same device as that used in the welding process before performing the welding process of a light-transmitting resin member and a light-absorbing resin member having the aluminum deposition.

The present exemplary embodiment can also utilize the laser beam welding apparatus with the Galvano scanners as shown in FIG. 1A. Specifically, a laser oscillator 10 can be connected to an optical fiber 11 which has a tip end that can project a laser beam 12 along an optical path. On the optical path, the focal point adjustment optical system 13 can be adjusted to be positioned in place. The focal point adjustment optical system 13 can include a movable lens (not shown) to adjust the focal position on the optical path. Then, the focal point adjustment optical system 13 can project a laser beam along an optical path. On the optical path, a first Galvano mirror 14 can be disposed to scan a processed surface with a laser beam in an x direction. On an optical path along which the laser beam reflected by the first Galvano minor 14, the second Galvano minor 15 can be disposed to scan the processed surface with a laser beam in the y direction.

The control unit 16 can control the Galvano mirrors 14 and 15 and the focal point adjustment optical system 13. An emitted laser beam 12s can be utilized for an xy scanning within a two-dimensional plane by means of the Galvano mirrors 14 and 15. In addition, the focal length can be controlled, so that the focal position can be moved in the z direction by means of adjusting the focal point adjustment optical system 13. In other words, the adjustment of the focal position of the laser beam can allow the laser beam to be scanned three-dimensionally.

Examples of the laser oscillator include laser oscillators with second or third harmonic YAG laser, semiconductor laser, fiber laser, and the like. If the scanning is only achieved two-dimensionally, a scanning head with an fθ lens can be used instead of the focal point adjustment optical system 13.

Figure 5:
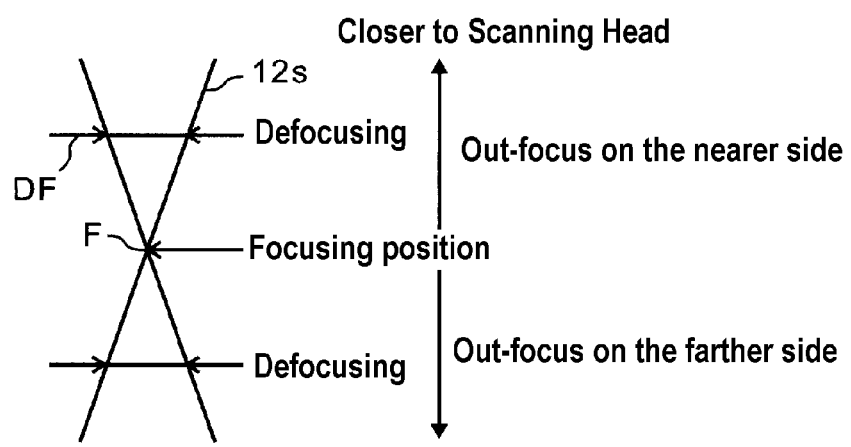
FIG. 5 is a schematic diagram showing the positional relationship between the foci of laser beams 12s.

FIG. 5 shows the position relation of focus of a laser beam 12s.

The laser beam 12s can focus on the focal position as a basic position while defocusing can be achieved near to the scanning head 31 (near-side out focus). In this manner, the beam diameter can be φ1.5 to 3.5 mm. By doing so, a larger welded region can be achieved, thereby obtaining a stronger bond. The defocusing point DF can be positioned in an opposite direction from the focal position (farther-side out focus), thereby also obtaining the same or similar advantageous effects.

To perform the method for manufacturing a resin molding in accordance with the present exemplary embodiment, first a housing 21 can be formed from a light-absorbing resin such as acrylonitrile-styrene-acrylate (ASA) in the form of a predetermined shape (for example, container shape). A lens 23 can be formed from a light-transmitting resin such as polymethylmethacrylate (PMMA) or polycarbonate. An aluminum deposition film can be formed on an inner surface of the housing 21 by a common vapor deposition method. Then, the following light reflecting film removing process and the welding process can be performed within the same device. In the present exemplary embodiment, there is no need to mask the to-be-welded surface of the housing 21 when Al is deposited on the inner surface of the housing 21 as a light reflecting film.

Figure 6A:
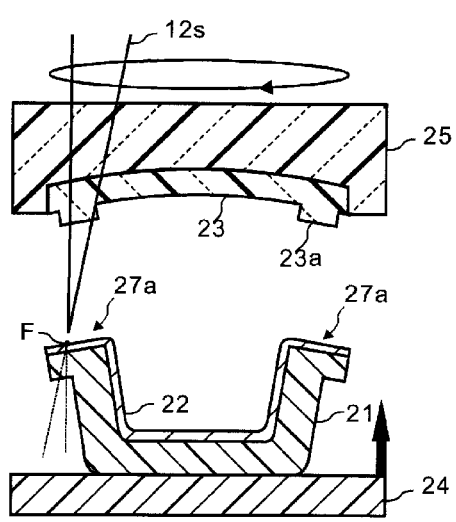
FIGS. 6A and 6B are schematic cross sectional views illustrating the target object in the light reflecting film removing step and the welding step according to principles of the presently disclosed subject matter.

With reference to FIG. 6A, a description will be given of the light reflecting film removing process in accordance with the present exemplary embodiment. FIG. 6A is a schematic cross sectional view of a workpiece disposed in the device in the removing process.

In accordance with the present exemplary embodiment, the light reflecting film removing process and the welding process can be continuously performed utilizing the same device. In the light reflecting film removing process prior to the welding process, the lens 23 formed from the light-transmitting resin closing the opening of the housing 21 can be fixed to an upper jig (light-transmitting pressure plate) 25 so as to face towards the housing 21. In the present exemplary embodiment, a rib 23a for welding can be formed on the lower surface of the lens 23 although the rib 23a is not an essential component. Note that the housing 21 can be formed from PET-PBT or the like.

As described above, on the inner surface that includes the welded surface 27a of the housing 21, a light reflecting film 22 such as an Al deposition film is formed, for example. The housing 21 can be fixed to a lower jig 24 that can move vertically.

If the housing 21 and the lens 23 are in close contact with each other, when the Al film 22 is peeled off, the peeled-off Al film cannot be sucked or vacuumed to the outside. In view of this, in the present exemplary embodiment, the lower jig 24 is lowered to separate the housing 21 and the lens 23 a predetermined distance to secure a space for vacuuming therebetween.

Laser beams 12s can be incident on the upper jig (light-transmitting pressure plate) 25, pass the lens 23, and be incident on the upper surface of the Al film 22 on the welded surface 27a of the housing 21 positioned below. The scanning head 31 can scan the welded region with the laser beam 12 repeatedly. At that time, the two dimensional position can be controlled by the Galvano mirrors 14 and 15 while the z-directional focal distance can be controlled by the focal point adjustment optical system 13. This can maintain the focusing condition for Al film removal (first focusing state).

The first focusing state in the light reflecting film removing process can be adjusted by disposing the focal position near the object to be removed. As shown in FIG. 6A, the focal position can be positioned near the Al film 22. Herein, "adjusted by disposing the focal position near the object to be removed" shall mean that the beam spot diameter of the laser beam 12s is 1.0 mm or less on the surface of the object to be removed.

The light reflecting film removing process of the present exemplary embodiment can be performed in the following conditions: laser output of 300 W, scanning speed of 1000 mm/sec, and cycle time of 100 or less. By doing so, the Al film 22 on the welded surface 27a can be sublimated to be removed. The sublimated and removed Al film can be sucked by a vacuum, blower, or other device (not shown) so as to prevent the Al film from being deposited again.

Figure 6B:
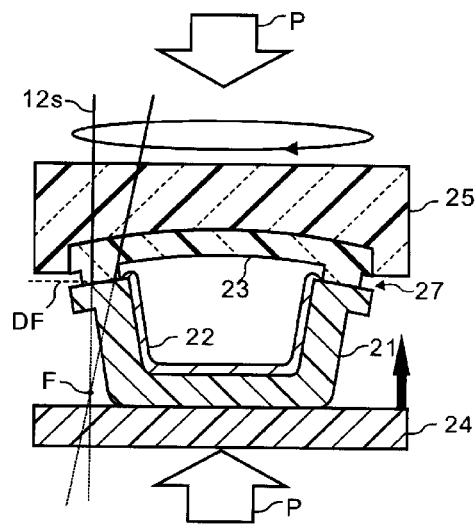

With reference to FIG. 6B, a description will be given of the welding process in accordance with the present exemplary embodiment. FIG. 6B is a schematic cross sectional view of the workpiece disposed in the same device in the removing process.

As shown in FIG. 6A, the lens 23 can be fixed to the upper jig (light-transmitting pressure plate) 25 above the housing 21. It should be noted that FIG. 6A illustrates the state prior to the removing process. However, FIG. 6A is used for reference in order to refer to the positional relationship between the components. In this state, the lower jig 24 can ascend in the direction of black arrow while the welding rib 23a on the lower surface of the lens 23 can be brought into close contact with the welded surface 27a that is exposed by removal of the Al film 22. The resulting state is described with reference to FIG. 6B. The laser beams 12s can pass the upper jig 25 and the lens 23 to be incident on the welded surface 27a of the housing 21 that is in contact with the rib 23a. The Galvano minors can be driven to scan the irradiated regions along the rib (welded region) 23a. At that time, the two dimensional position can be controlled by the Galvano mirrors 14 and 15 while the z-directional focal distance can be controlled by the focal point adjustment optical system 13. This can maintain the focusing condition for welding (second focusing state).

In the second focusing state during the welding process, the laser beam 12s can be in the defocusing state described with reference to FIG. 5 so that the focal position is adjusted to be positioned farther from the to-be-welded surface of the workpiece. Specifically, as shown in FIG. 6B, the defocusing point DF can be adjusted to be positioned near the irradiation position (the contacting area between the rib 23a and the welded surface 27a). The defocused laser beam 12s from the scanning head 31 (near-side out focus) can be projected on and melt the wider area of the welded region with the expanded beam diameter of ϕ1.5 to 3.5 mm at the irradiation position.

In the welding process of the present exemplary embodiment, for example, the irradiation conditions are as follows: the laser output of 150 to 240 W, the scanning speed of 1000 mm/sec to 20000 mm/s, and the scanning cycles of 10 to 300 cycles, thereby scanning the irradiation areas. If the housing 21 is formed from ASA that is colored dark gray, the laser output can be set to 200 W to thereby melt the wider area of the welded region. It should be noted that, since the laser beam absorption by the housing 21 may depend on the color of the resin material for the housing 21, the laser output may be adjusted in accordance with color characteristics.

The scanning cycle times can be set on the basis of the scanning speed and the peripheral length of the welded surface 27a (welded line). In this case, the ratio of the peripheral length to the scanning speed (length/speed) may be substantially constant. For example, if the peripheral length is 1200 mm and the scanning speed is 10,000 mm/s, the scanning cycle times may be 200 times. If the peripheral length is 1200 mm and the scanning speed is 1,000 mm/s, the scanning cycle times may be 20 times.

Further, the trajectory or trajectories of the laser beam 12s can be the same trajectory at every cycle time or may be slightly shifted outward/inward.

In the light reflecting film removing process and the welding process as illustrated in FIGS. 6A and 6B, the position of the lower jig 24 and the focal position of the laser beam 12s can take the following relations: when the lower jig 24 is in the descending position, the laser beam 12s is set in the first focusing state; when the lower jig 24 is in the ascending position (the lower surface or rib 23a of the lens 23 is brought into contact with the upper surface or welded surface 27a of the housing 21), the laser beam 12s is set in the second focusing state.

In the illustrated example, the lower jig 24 can be moved vertically so that the first focusing state can be achieved at the descending position of the lower jig 24 and the second focusing state can be achieved at the ascending position on the basis of the shapes and dimensions of the housing and lens. In this case, because of the vertical movement of the lower jig 24, the focal point adjustment optical system 13 of the scanning head 31 can be omitted as appropriate. If fine focal position adjustment is required depending on the shape and/or dimension of the housing and/or lens, the focal point adjustment optical system 13 can be advantageously utilized.

According to the present exemplary embodiment of the presently disclosed subject matter, the vertical movement of the lower jig 24 can change the focusing state of the laser beam 12s, so that the light reflecting film removing process and the welding process can be performed in the same device. This configuration can reduce the investment cost for the facility for molding.

Further, according to the present exemplary embodiment, the light reflecting film removing process is performed before the welding process, thereby performing the removal (peeling-off) of the Al film 22 on the welded surface 27a with ease. Accordingly, there is no need to apply a mask to the housing 21 before the Al deposition process as a pre-treatment. This means the method for manufacturing a resin molding can exclude the masking step for the welded surface 27a of the housing 21, thereby reducing the manufacturing cost.

In the above exemplary embodiment, the housing 21 is welded to the single lens 23, but the housing 21 may be welded to two or more lenses, for example, including an inner lens and an outer lens in the same facility/device for several processes.

The presently discloses subject matter is not limited to those described with reference to the above exemplary embodiments and drawings. For example, the combination of the light-transmitting resin member and the light-absorbing resin member is not limited to the combination of a lens and a housing. For example, the presently disclosed subject matter can be applied to the manufacturing of a showcase for storing small articles of value.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A method for manufacturing a resin molding, the resin molding including a light-absorbing resin member having a three-dimensional weld region extending in a predetermined extending direction and a light-transmitting resin member having a corresponding three-dimensional weld region extending in the predetermined extending direction, the method comprising:
arranging and pressing the three-dimensional weld region of the light-absorbing resin member and the corresponding three-dimensional weld region of the light-transmitting resin member so that they are opposed to each other and are brought into contact with each other, the three-dimensional weld region including a maximum height portion;

setting a plurality of irradiation areas with at least part of a loop shape in the extending direction of the three-dimensional weld regions and arranging a plurality of laser irradiation scanning heads corresponding to the respective irradiation areas and above respective centers of the loop shapes of the irradiation areas so that the scanning heads each have a center irradiation direction inclined to face the corresponding loop shape and the maximum height portion of the weld region is disposed in between the irradiation areas of the scanning head, and that the scanning heads are configured to emit laser beams that are incident on the light-transmitting resin member, with the irradiation areas including a single irradiation area upon which a corresponding scanning head can irradiate with a laser beam and a composite irradiation area which adjacent scanning heads can irradiate with respective laser beams, each of the laser irradiation scanning heads including a laser optical system with a Galvano scanner so as to perform three-dimensional scanning for laser beam welding;

activating the plurality of scanning heads to cause the plurality of laser beams to repeatedly scan the single irradiation area along a first trajectory in the extending direction of the single irradiation area and part of both the single irradiation area and the composite irradiation area along a second trajectory in the extending direction in such a manner that the respective laser beams are irradiated alternately within the composite irradiation area while the laser beams are scanned along the first trajectory and the second trajectory alternately, so that the weld regions in their entirety are repeatedly heated to stepwisely increase the temperature thereof and fused to weld the light-transmitting resin member and the light-absorbing resin member.

2. The method for manufacturing a resin molding according to claim 1, further comprising: setting a plurality of scanning lines in a width direction of the weld regions and perpendicular to the predetermined extending direction so that the scanning lines extend in the extending direction, and scanning the laser beams sequentially along the plurality of scanning lines.

3. The method for manufacturing a resin molding according to claim 2, further comprising: scanning the laser beams at a predetermined scanning speed depending on an angle of incidence with respect to the weld region.

4. The method for manufacturing a resin molding according to claim 3, further comprising: scanning the laser beams with a predetermined focal distance depending on an angle of incidence with respect to the weld region.

5. The method for manufacturing a resin molding according to claim 2, further comprising: scanning the laser beams with a predetermined focal distance depending on an angle of incidence with respect to the weld region.

6. The method for manufacturing a resin molding according to claim 2, wherein the composite irradiation area has a width of 20 mm.

7. The method for manufacturing a resin molding according to claim 1, further comprising: scanning the laser beams at a predetermined scanning speed depending on an angle of incidence with respect to the weld region.

8. The method for manufacturing a resin molding according to claim 7, further comprising: scanning the laser beams with a predetermined focal distance depending on an angle of incidence with respect to the weld region.

9. The method for manufacturing a resin molding according to claim 7, wherein the composite irradiation area has a width of 20 mm.

10. The method for manufacturing a resin molding according to claim 1, further comprising: scanning the laser beams with a predetermined focal distance depending on an angle of incidence with respect to the weld region.

11. The method for manufacturing a resin molding according to claim 10, wherein the composite irradiation area has a width of 20 mm.

12. The method for manufacturing a resin molding according to claim 1, wherein the composite irradiation area has a width of 20 mm.

13. The method for manufacturing a resin molding according to claim 1, further comprising: forming a light reflecting film on the light-absorbing resin member at a predetermined area.

* * * * *